United States Patent [19]

Matsumoto et al.

[11] Patent Number: 5,168,448
[45] Date of Patent: Dec. 1, 1992

[54] SHOCK ABSORBER CONTROLLER

[75] Inventors: Tadaichi Matsumoto, Toyota; Nobuaki Kanamori, Susono, both of Japan

[73] Assignee: Toyota Jidosha Kabushiki Kaisha, Toyota, Japan

[21] Appl. No.: 516,912

[22] Filed: Apr. 30, 1990

[30] Foreign Application Priority Data

May 12, 1989 [JP] Japan ................................. 1-119596

[51] Int. Cl.⁵ ............................................. B60G 17/06
[52] U.S. Cl. ............................. 364/424.05; 280/707; 280/840
[58] Field of Search ................... 364/424.05; 280/707, 280/840, DIG. 1

[56] References Cited

U.S. PATENT DOCUMENTS

| | | | |
|---|---|---|---|
| 4,714,272 | 12/1987 | Buma et al. | 280/707 |
| 4,728,120 | 3/1988 | Buma et al. | 280/707 |
| 4,729,580 | 3/1988 | Buma et al. | 280/707 |
| 4,744,589 | 5/1988 | Buma et al. | 280/707 |
| 4,756,549 | 7/1988 | Kurosawa et al. | 280/707 |
| 5,015,007 | 5/1991 | Uchiyama et al. | 280/707 |

FOREIGN PATENT DOCUMENTS 62-166104  7/1987  Japan.

Primary Examiner—Gary Chin
Attorney, Agent, or Firm—Oblon, Spivak, McClelland, Maier & Neustadt

[57] ABSTRACT

A shock absorber controller controls a shock absorber so that a damping force thereof is increased when a vertical movement of a vehicle body is returned approximately to a mean position of the vehicle body after it is determined that it is necessary to alter the damping force of the shock absorber.

16 Claims, 8 Drawing Sheets

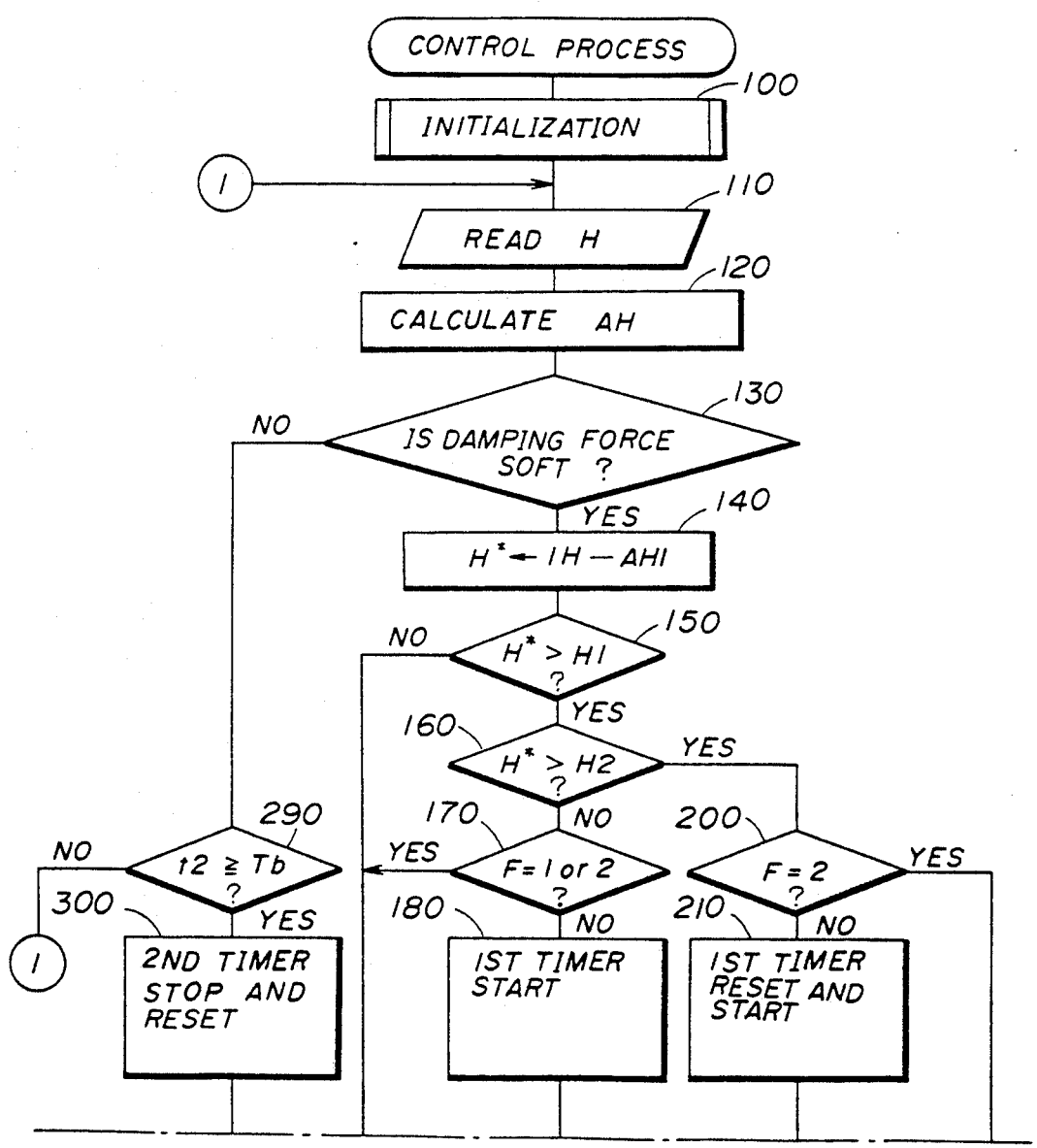

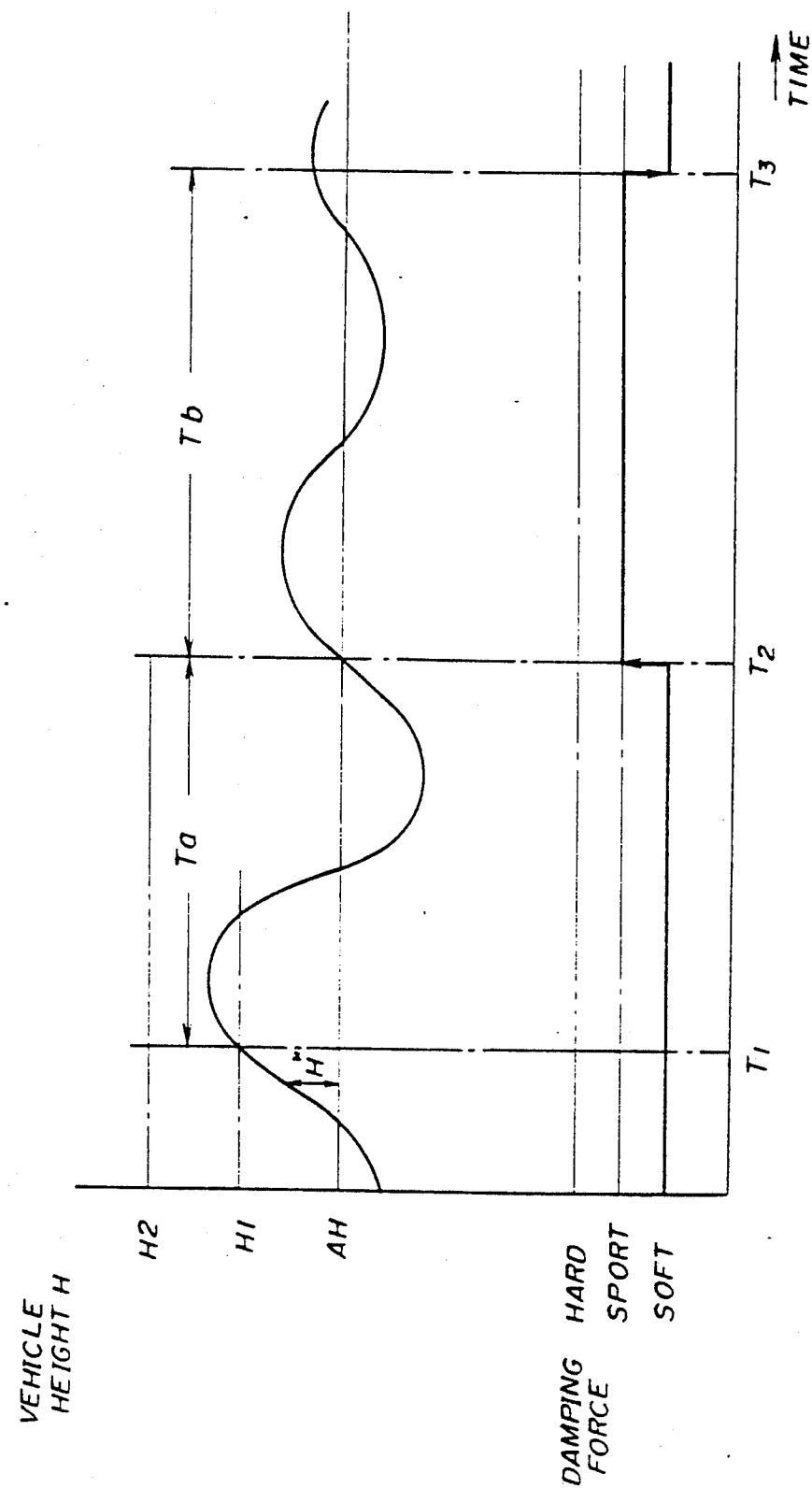

SHOCK ABSORBER CONTROLLER

BACKGROUND OF THE INVENTION (1) Field of the Invention

The present invention relates to a shock absorber controller for altering a damping force of a shock absorber in a vehicle suspension in response to a vertical movement of a vehicle body due to a rough road surface.

(2) Description of the Prior Art

Conventionally, there is known an apparatus for controlling a damping force of a shock absorber provided between a vehicle body and each wheel so that a vertical movement of a vehicle body due to a rough road surface is suppressed in an early stage of the vertical movement. Japanese Laid-Open Patent Application No. 62-166104, entitled "SHOCK ABSORBER CONTROLLER", discloses an apparatus in which the shock absorber is controlled so that the damping force thereof is altered from a weak state to a strong state when a predetermined delay time has elapsed after the vehicle height exceeds a definite value. The predetermined delay time is determined, taking into consideration the vertical movement cycle of the vehicle body so that the magnitude of the damping force is changed within half of the first one-cycle of the vertical movement. With this arrangement, it is possible to suppress a large vertical movement of the vehicle body within half of the first one-cycle so that the vehicle height can be restored to a mean vehicle height or position.

However, there is a problem that the timing of altering the magnitude of the damping force changes, depending on the magnitude of the vertical movement of the vehicle body. This will be described with reference to FIG. 1, in which the horizontal axis represents time and the vertical axis represents the vehicle height. When the vertical movement of the vehicle body has a relatively small waveform $S_1$ of vibration, the vehicle height exceeds a predetermined height $h_0$ at time $t_1$ and the magnitude of damping force is changed at time $t_2$ when a delay time $t_a$ elapses from time $t_1$. On the other hand, when the vertical movement of the vehicle body has a relatively large waveform $S_2$ of vibration, the vehicle height exceeds the predetermined height $h_0$ at time $t_3$ and the magnitude of damping force is changed at time $t_4$ when the delay time $t_a$ elapses from $t_3$. It will be seen from the graph of FIG. 1 that the magnitude of damping force is changed at different times for the different magnitudes of vertical movement of the vehicle body. That is, the altering of the damping force is not in synchronism with the vibration cycle of the vertical movement and is altered at a variety of different times. Thus, in some cases the magnitude of damping force is changed in a state where the vehicle height is considerably higher than the mean height or the vehicle height has almost returned to the mean height. Such altering of damping force deteriorates ride comfort.

SUMMARY OF THE INVENTION

A general object of the present invention is to provide an improved shock absorber controller in which the aforementioned disadvantages are eliminated.

A more specific object of the present invention is to provide a shock absorber controller capable of altering the magnitude of damping force with timing in synchronism with the vibration cycle of the vertical vehicle movement.

These objects of the present invention are achieved by a shock absorber controller comprising vertical movement detection means for detecting a vertical movement of a vehicle body relative to a wheel; damping force alteration means for altering a damping force of a shock absorber provided between the vehicle body and the wheel; and first excess determination means, coupled to the vertical movement detection means, for determining whether or not the vertical movement of the vehicle body exceeds a first threshold value. The shock absorber controller also comprises alteration instruction output means, coupled to the damping force alteration means and the first excess determination means, for generating an instruction signal which is supplied to the damping force alteration means when a predetermined delay time elapses from a first time at which the first excess determination means determines that the vertical movement of the vehicle body exceeds the first threshold value, the instruction signal instructing the damping force alteration means so that the damping force of the shock absorber is increased; second excess determination means, coupled to the vertical movement detection means and the alteration instruction output means, for determining, during the predetermined delay time from the first time, whether or not the vertical movement of the vehicle body exceeds a second threshold value which indicates a position of the vehicle body farther from a mean position of the vehicle body than a position corresponding to the first threshold value; and starting point change means, coupled to the alteration instruction output means and the second excess determination means, for changing a starting point of the predetermined delay time from the first time to a second time at which the second excess determination means determines that the vertical movement of the vehicle body exceeds the second threshold value.

The aforementioned objects of the present invention are also achieved by a shock absorber controller comprising vertical movement detection means for detecting a vertical movement of a vehicle body relative to a wheel; damping force alteration means for altering a damping force of a shock absorber provided between the vehicle body and the wheel; determination means, coupled to the vertical movement detection means, for determining whether or not it is necessary to alter the damping force of the shock absorber on the basis of the magnitude of the vertical movement of the vehicle body; and control means, coupled to the vertical movement detection means and the damping force alteration means, for generating an instruction signal which is supplied to the damping force alteration means when the vertical movement of the vehicle body is returned approximately to a mean position of the vehicle body after the determination means determines that it is necessary to alter the damping force of the shock absorber, the instruction signal instructing the damping force alteration means to increase the damping force of the shock absorber.

BRIEF DESCRIPTION OF THE DRAWINGS

Further objects, features and advantages of the present invention will become apparent from the following detailed description when read in conjunction with the accompanying drawings, in which:

FIG. 6 is a diagram showing how to combine FIGS. 6A and 6B;

FIGS. 6A and 6B are flowcharts showing a shock absorber control executed in the embodiment shown in FIG. 4;

FIGS. 7A and 7B are timing charts respectively illustrating how the shock absorber is controlled according to the embodiment shown in FIG. 4

DESCRIPTION OF THE PREFERRED EMBODIMENTS

A description will now be given of the principle of the shock absorber controller according to the present invention with reference to FIG. 2.

Figure 2:
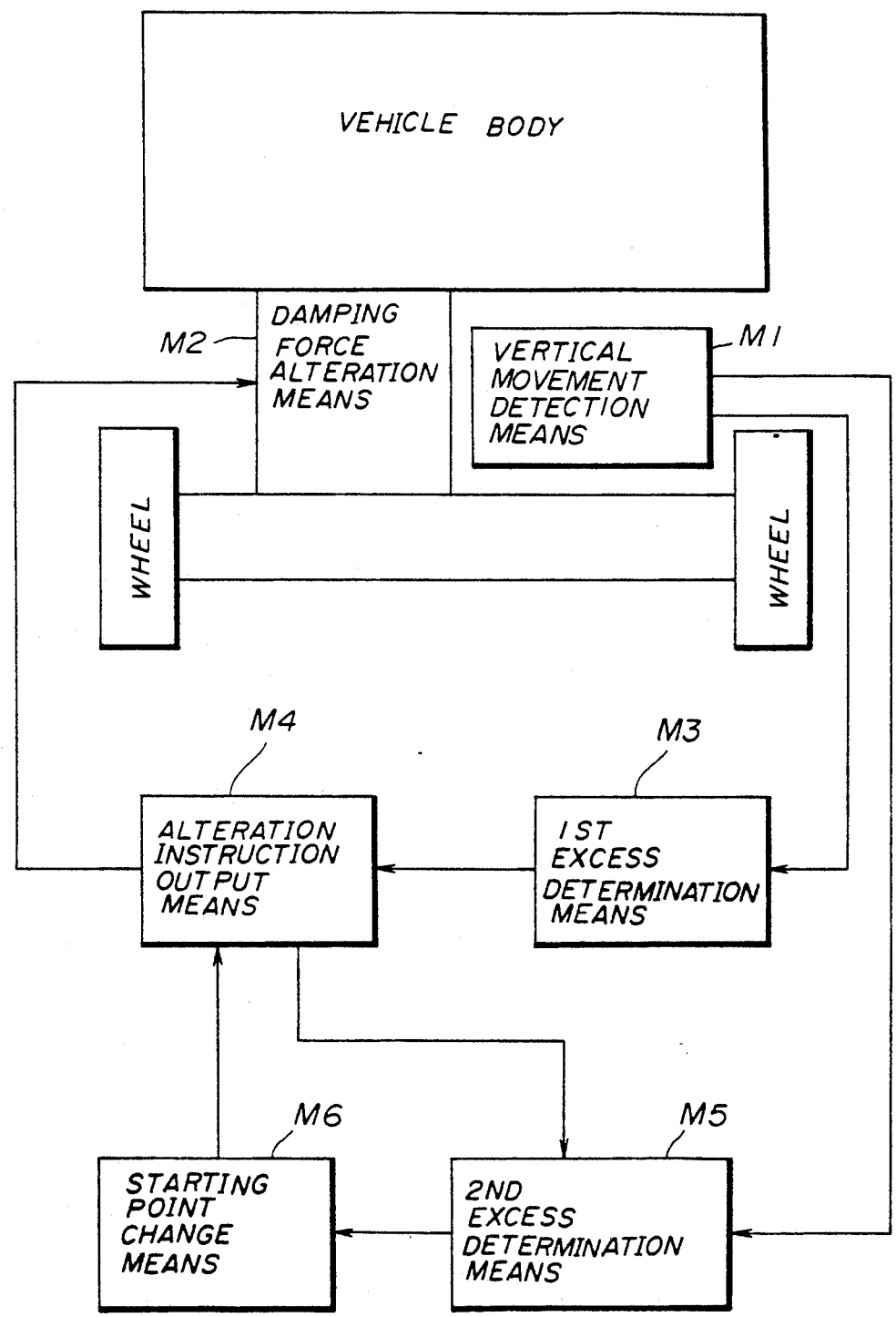
FIG. 2 is a block diagram illustrating the principle of the present invention.

The shock absorber controller in FIG. 2 comprises a vertical movement detection means M1, a damping force alteration means M2, a first excess determination means M3, an alteration instruction output means M4, a second excess determination means M5 and a starting point change means M6. The vertical movement detection means M1 detects a relative vertical movement of a vehicle body with respect to a wheel. The damping force alteration means M2 detects the magnitude of a damping force of a shock absorber provided between the vehicle body and each wheel. The first excess determination means M3 determines whether a vertical movement of the vehicle body detected by the vertical movement detection means M1 exceeds a first threshold value. The alteration instruction output means M4 outputs an instruction which instructs the damping force alteration means M2 to control the shock absorber so that it provides an increased damping force after a predetermined delay time from a starting point at which the first excess determination means M3 determines that the vertical movement of the vehicle body exceeds the first threshold value. The second excess determination means M5 continues to determine, until the predetermined delay time elapses, whether the vertical movement of the vehicle body detected by the vertical movement detection means M1 exceeds a second threshold value which is farther from a mean position of the vehicle body than the first threshold value. When the second excess determination means M5 detects a vertical movement of the vehicle body which exceeds the second threshold value, the starting point change means M6 changes the starting point of measuring the predetermined delay time used in the alteration instruction output means M4 to the time at which it is determined that the vertical movement of the vehicle body exceeds the second threshold value.

When the first excess determination means M3 determines that the vertical movement of the vehicle body relative to the wheel exceeds the first threshold value, the alteration instruction output means M4 provides the damping force alteration means M2 with the instruction which instructs the damping force alteration means M2 to control the shock absorber so that it provides an increased damping force after the predetermined delay time from the time when the vertical motion of the vehicle body exceeds the first threshold value. Until the predetermined delay time elapses, the second excess determination means M5 continues to determine whether the vertical movement of the vehicle body detected by the vertical movement detection means M1 exceeds the second threshold value which indicates a vehicle height farther from the mean position of the vehicle body than a position corresponding to the first threshold value. When it is determined that the vertical movement of the vehicle body exceeds the second threshold value, the starting point change means M6 changes the starting point of measuring the delay time used in the alteration instruction output means M4 to the time at which it is determined that the vertical movement of the vehicle body exceeds the second threshold value.

Figure 1:
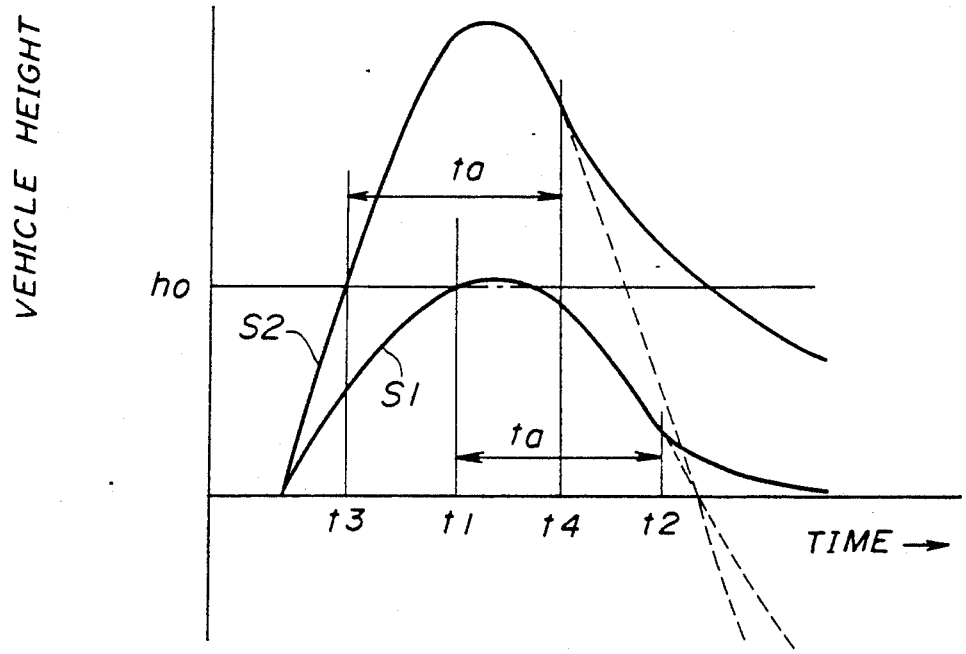
FIG. 1 is a graph illustrating the problems to be solved by the present invention.
Figure 3:
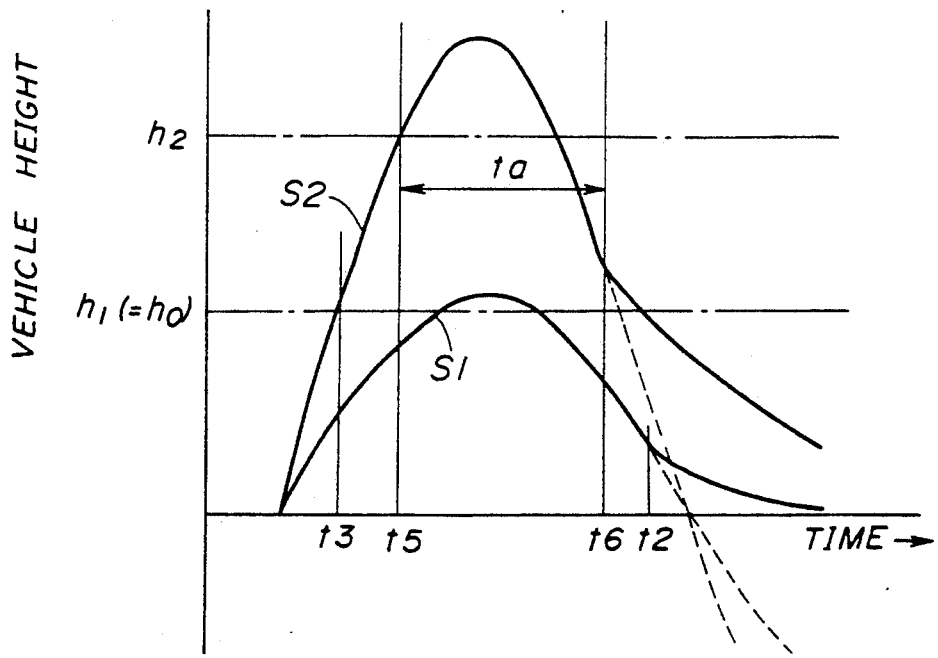
FIG. 3 is a graph illustrating the function of the present invention.

Referring to FIG. 3, the alteration instruction output means M4 always determines whether or not the delay time $t_a$ elapses from time $t_3$ at which the vehicle height having a vertical movement having a large waveform $S_2$ of vibration exceeds the first threshold value labeled $h_1$ (it is now assumed that $h_1 = h_0$ (FIG. 1)). It will be noted that the vehicle height exceeds the second threshold value labeled $h_2$ before the elapse of the delay time $t_a$ from time $t_3$ elapses. This is detected by the second excess determination means M5, which instructs the alteration instruction output means M4 to measure the delay time $t_a$ from time $t_5$ in place of time $t_3$. When the delay time $t_a$ from time $t_5$ elapses ($t_6$), the alteration instruction output means M4 controls the damping force alteration means M2 so that the damping force of the shock absorber is altered to an increased value. Thus, the difference between the damping force altering time for the vibration waveform $S_1$ and the damping force altering time for the vibration waveform $S_2$ is small compared with the aforementioned prior art (FIG. 1). That is, the damping force altering timing can be maintained so as to be approximately constant irrespective of the magnitude of vertical movement so that the damping force altering timing is controlled so as to be synchronized to the vibration cycle of the vehicle body.

Figure 4:
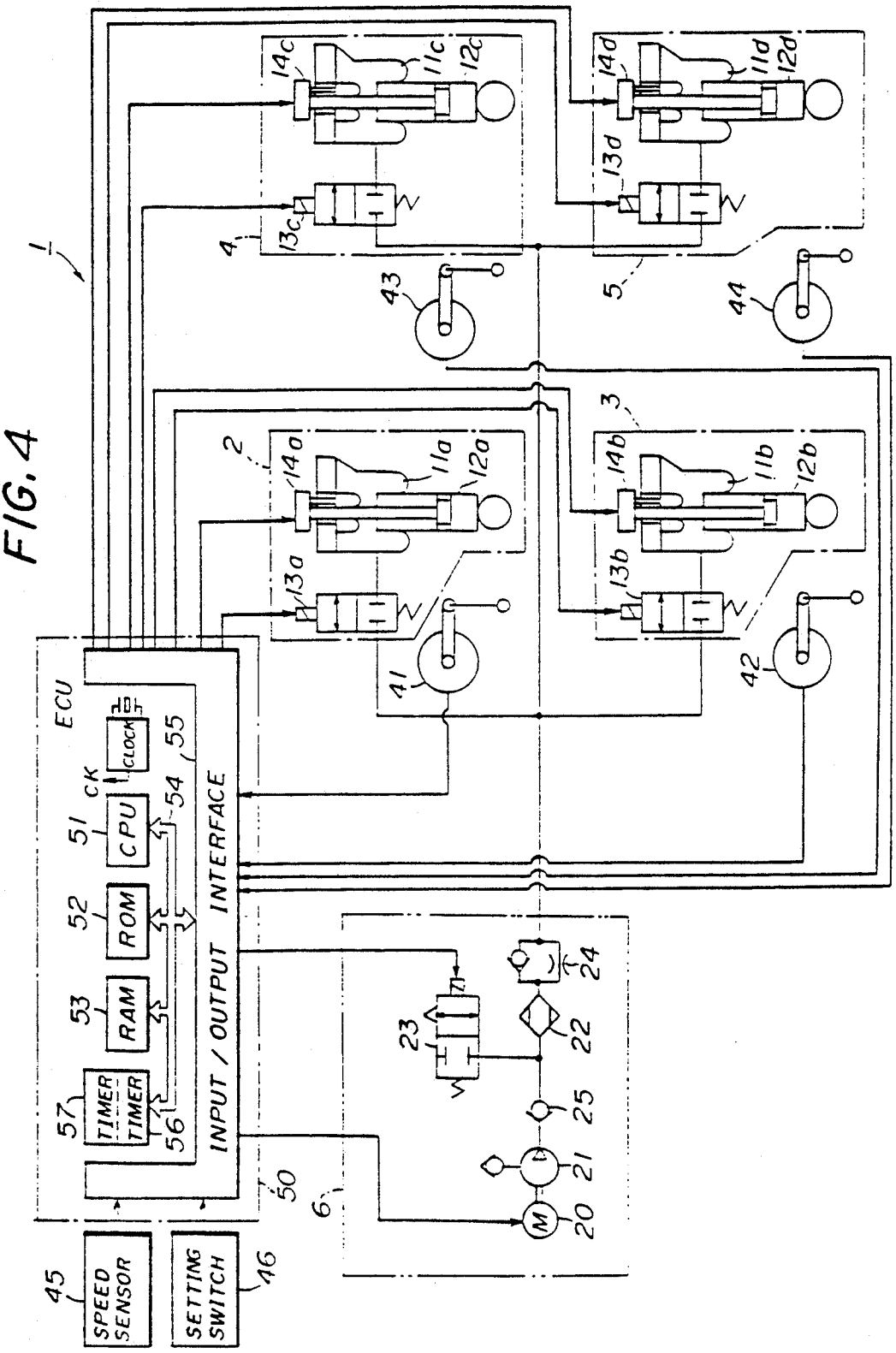
FIG. 4 is a diagram of a system including a shock absorber controller and air suspensions controlled thereby according to a preferred embodiment of the present invention.

A description will now be given of a preferred embodiment of the present invention. FIG. 4 illustrates a system having air suspensions and a shock absorber controller for controlling the air suspensions according to the preferred embodiment of the present invention. Air suspensions 2, 3, 4 and 5 are respectively provided between a vehicle body and left and right front wheels and left and right rear wheels. Since each of the air suspensions 2, 3, 4 and 5 has the same structure, only the air suspension 2 provided between the vehicle body and the right front wheel will be described in detail for the sake of convenience.

The air suspension 2 includes a variable volume type air chamber 11a and a variable damping force type shock absorber 12a. The air chamber 11a functions to change the vehicle height. Further, the air suspension 2 includes a vehicle height control valve 13a and an air suspension actuator 14a. The vehicle height control valve 13a, which is a 2-port and 2-position electromagnetic valve of a spring off-set type, normally interrupts the passage of compressed air from a compressed air feed and discharge system 6, and connects the air passage when adjusting the vehicle height. The air suspension actuator 14a functions to alter the magnitude of the damping force of the shock absorber 12a. The air suspensions 2, 3, 4 and 5 are further described in U.S. Pat. No. 4,744,589, the disclosure of which is hereby incorporated by reference.

The compressed air feed and discharge system 6 includes a motor 20, a compressor 21, an air drier 22, an air solenoid valve 23 and check valves 24 and 25. The motor 20 drives the compressor 21 to generate compressed air necessary to increase the vehicle height. The air drier 22 functions to dry the compressed air from the compressor 21 via the check valve 25. The air solenoid valve 23 discharges air from the air chambers 11a, 11b, 11c and 11d when decreasing the vehicle height. During adjustment of the vehicle height, the air solenoid valve 23 is controlled so that it is maintained in a closed state or an open state. When the air solenoid value 23 is closed and the vehicle height control valves 13a, 13b, 13c and 13d are opened, the compressed air from the compressor 21 is fed to the vehicle height control valves 13a, 13b, 13c and 13d so that the vehicle height is increased. On the other hand, when the air solenoid value 23 is opened and the vehicle height control valves 13a, 13b, 13c and 13d are opened, the compressed air in the air chambers 11a, 11b, 11c and 11d is discharged therefrom so that the vehicle height is decreased.

Figure 5A:
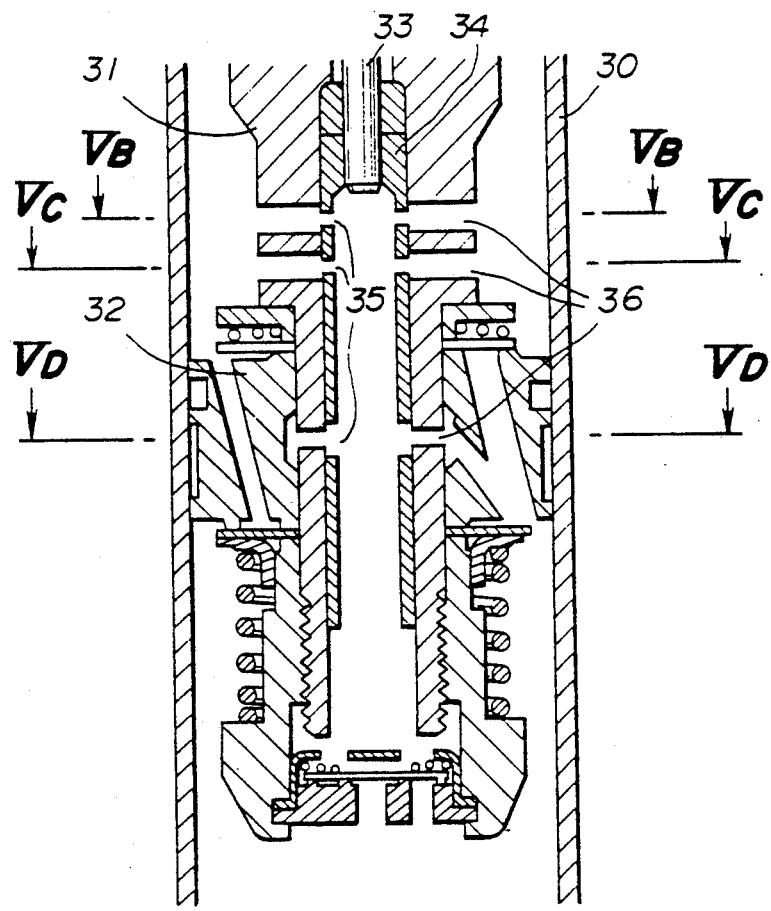
FIG. 5A is a vertical sectional view of a shock absorber used in the embodiment shown in FIG. 4.
Figures 5B, 5C, 5D:
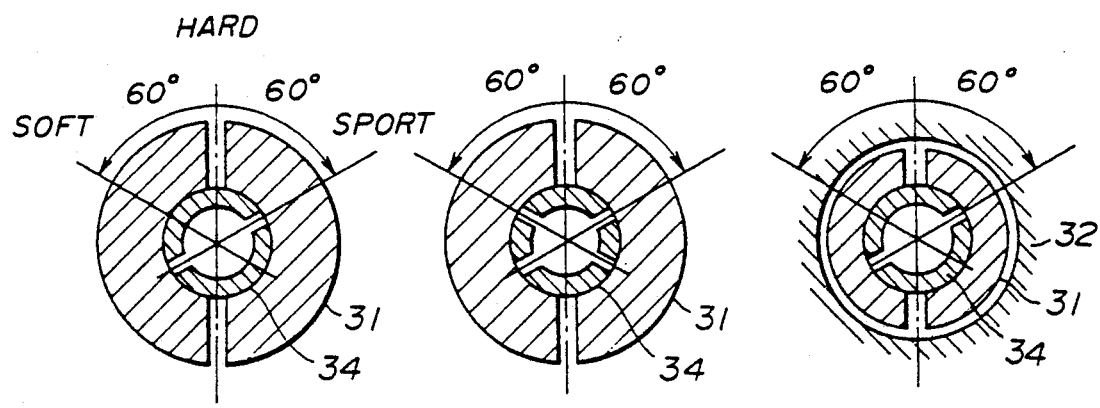
FIG. 5B is a diagram taken along line $V_B$—$V_B$ shown in FIG. 5A.
FIG. 5C is a diagram taken along line $V_C$—$V_C$ shown in FIG. 5A.
FIG. 5D is a diagram taken along line $V_D$—$V_D$ shown in FIG. 5A.

The shock absorber 12a will be described below with reference to FIGS. 5A through 5D. FIGS. 5B, 5C and 5D are diagrams respectively taken along lines $V_B$—$V_B$, $V_C$—$V_C$ and $V_D$—$V_D$ shown in FIG. 5A. Each of the shock absorbers 12b, 12c and 12d has the same structure as the shock absorber 12a. Referring to FIG. 5A, the shock absorber 12a includes a piston rod 31 provided inside an outer cylinder 30 and a piston 32 which is slidably fitted in an inner wall of the outer cylinder 30. Inside the piston rod 31 is movably provided a control rod 33, which is driven by the air suspension actuator 14a (FIG. 4). A rotary valve 34 integrated with the control rod 33 is provided inside the piston rod 31. The rotary valve 34 is provided with three orifices 35, and the piston rod 31 is provided with three orifices 36. The air suspension actuator 14a rotates the control rod 33 so that the orifices 35 and 36 are opened or closed and the amount of oil passing therethrough is adjusted. By means of the adjustment of the damping force of the shock absorber 12a, it is possible to set the suspension characteristic to either SOFT state, SPORT state or HARD state. When the damping force is adjusted so as to be small, the suspension characteristic is set to SOFT state. When the damping force is adjusted so as to be large, the suspension characteristic is set to HARD state. The SPORT state is an intermediate state between SOFT state and HARD state.

The air suspension actuator 14a includes a direct current motor (not shown), the rotation force of which is transferred to the control rod 33 of the shock absorber 12a via a gear engaging with a shaft of the direct current motor. This arrangement is disclosed in U.S. Pat. No. 4,756,549, the disclosure of which is hereby incorporated by reference. When the direct current motor is rotated in a normal or reverse direction under the control of an electronic control unit 50 (which will be described in detail later), the control rod 33 rotates in the normal or reverse direction so that the aforementioned orifices 35 and 36 are opened or closed. Thus, the damping forces of the shock absorbers 12a, 12b, 12c and 12d are altered.

The vehicle shown in FIG. 4 includes conventional vehicle height sensors 41, 42, 43 and 44, a vehicle speed sensor 45 and a vehicle height setting switch 46. Each of the vehicle height sensors 41, 42, 43 and 44 is provided between the vehicle body and a corresponding one of the four wheels, and outputs a detection signal representative of a vehicle height H corresponding to a gap between the vehicle body and a corresponding suspension arm which moves in response to a vertical movement of the wheel. The vehicle speed sensor 45 detects the speed of the vehicle. The vehicle height setting switch 46 is used for inputting a target vehicle height data such as a threshold value.

The output signals from the sensors 41–45 and the vehicle height setting switch 46 are input to the electronic control unit (hereafter simply referred to as an ECU) 50. On the other hand, the ECU 50 drives the motor 20, and the air solenoid valves 13a, 13b, 13c and 13d to control the vehicle height. Further, the ECU 50 drives the air suspension actuators 14a, 14b, 14c and 14d so that the damping force of each shock absorber (corresponding to suspension characteristic) is selectively set to either one of SOFT state, SPORT state or HARD state.

The ECU 50 includes a central processing unit (hereafter simply referred to as a CPU) 51, a read only memory (hereafter simply referred to as a ROM) 52 and a random access memory (hereafter simply referred to as a RAM) 53, all of which are connected to each other through a common bus 54 connected to an input/output interface circuit 55. The ROM 52 stores a program of the control procedure shown in FIGS. 6A and 6B. The RAM 53 temporarily stores various data. The signals from the aforementioned sensors 41 through 45 and the switch 46 are input to the CPU 51 through the input/output interface circuit 55. On the other hand, the CPU 51 outputs control signals to the aforementioned actuators and valves through the input/output interface circuit 55. The ECU 50 includes first and second timers 56 and 57 of a self-running type, each of which generates an interrupt to the operation of the CPU 51. Each of the first and second times 56 and 57 counts a clock signal CK generated by a clock generator provided in the ECU 50.

Figure 6B:
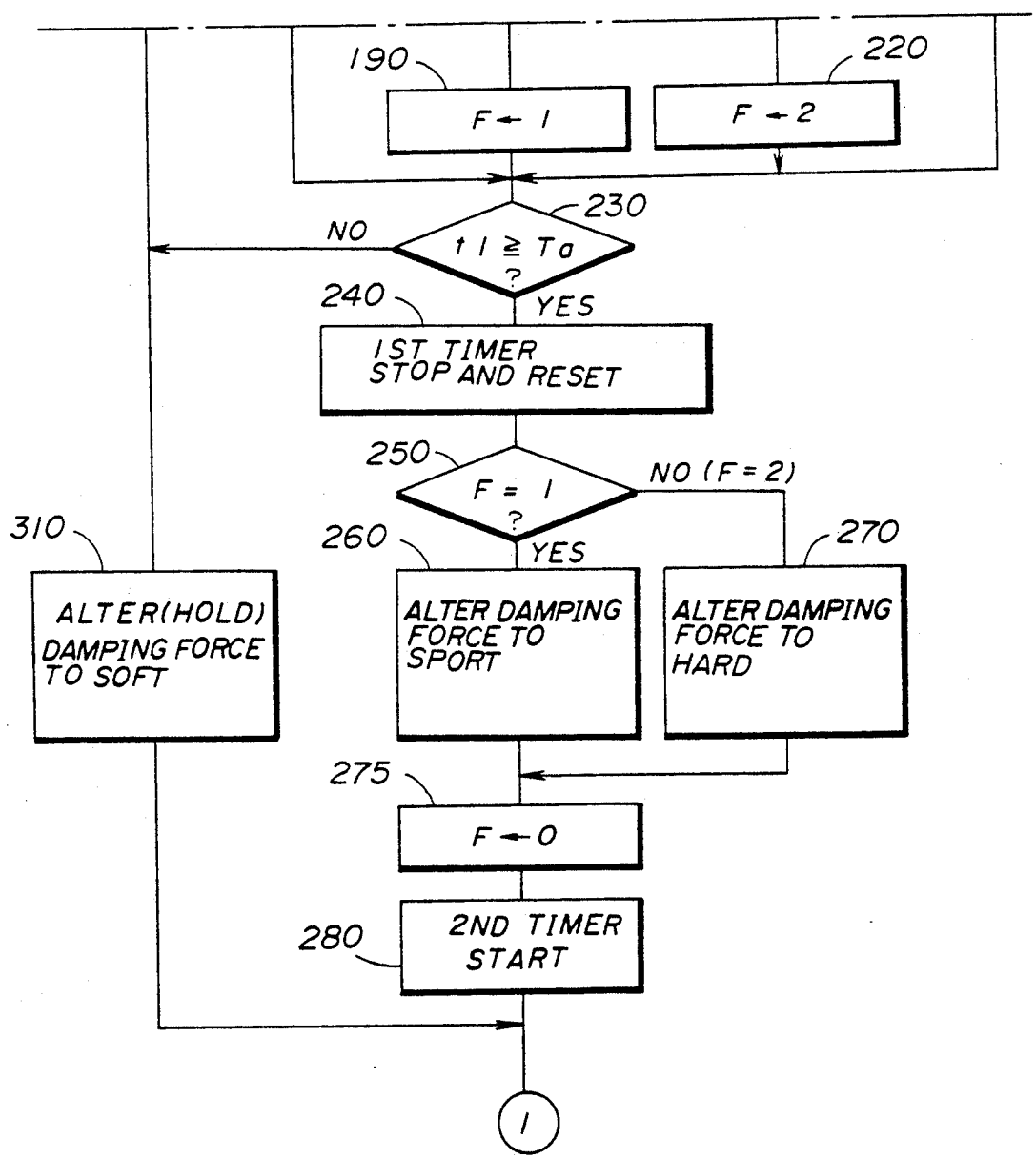

A description will now be given of a process of controlling the aforementioned shock absorbers 12a, 12b, 12c and 12d with reference to FIGS. 6A and 6B. The control process shown in FIGS. 6A and 6B is independently carried out for each of the shock absorbers 12a, 12b, 12c and 12d, and thus only the control process for the shock absorber 12a provided for the right front wheel will be described in detail below for the sake of convenience.

The ECU 50 is activated and the control process is started. At step 100, an initialization is executed, i.e., the RAM 53 is cleared, and the first and second timers 56 and 57 and registers for storing various data are reset to zero. At step 110, a process is executed in which data representative of the vehicle height H is derived from the sensor signal from the vehicle height sensor 41 provided for the right front wheel. At step 120, a process is executed which calculates an averaged vehicle height AH representative of a mean position of the vehicle body with respect to vertical movement thereof. For example, step 120 refers to previously obtained eight averaged vehicle heights, AH1 (the latest data), AH2, ..., AH8 and uses the following equation:

$$AH = \left[\left(\sum_{n=1}^{8} AHn + 4\right) \cdot \frac{1}{8} + 3 \cdot AH1 + 4\right)\right]/8.$$

At step 130, the CPU 51 determines whether or not the current damping force of the shock absorber 12a is controlled so as to be SOFT. The damping force of the shock absorber 12a is controlled so that it is maintained in SOFT state for a while after the ECU 50 is activated. When it is determined, at step 130, that the damping force of the shock absorber 12a is in SOFT state, the control process proceeds to step 140. At this step, the CPU 51 calculates an absolute value of the difference between the vehicle height H obtained at step 110 and the averaged vehicle height AH obtained at step 120, and determines the absolute value to be a vehicle height displacement H*.

At step 150, the CPU 51 determines whether or not the vehicle height displacement H* is greater than a threshold value H1 for SPORT. When the result obtained at step 150 is YES, the control process proceeds to step 160, at which it is further determined whether or not the vehicle height displacement H* is greater than a threshold value H2 for HARD. When it is determined, at step 160, that the vehicle height displacement H* is equal to or less than the threshold value H2, the control process proceeds to step 170. At this step, the CPU 51 determines whether a flag F (which will be described later) is 1 or 2. When it is determined that the flag F is set to neither 1 nor 2, the CPU 51 instructs the first timer 56 to start to operate at step 180. At step 190 (FIG. 6B), the CPU 51 sets the flag F to 1. On the other hand, when it is determined, at step 160, that the vehicle height displacement H* is greater than the threshold value H2 for HARD, the control process proceeds to step 200, at which it is determined whether or not the flag F has a value of 2. When the result obtained at step 200 is NO, at step 210 the CPU 51 resets the first timer 56 to zero and starts to operate the same. At step 220, the CPU 51 sets the flag F to 2.

Step 190 or step 220 is executed and then the control process proceeds to step 230, at which the CPU 51 determines whether time $t_1$ indicated by the first timer 56 is equal to or greater than a predetermined delay time Ta. When step 150 determines that the vehicle height displacement H* is equal to or less than the threshold value H1, when step 170 determines that the flag F is neither 1 nor 2, or when it is determined at step 200 that the flag F is 2, the control process proceeds to step 230. When it is determined, at step 230, that $t_1 \geq Ta$, the control process proceeds to step 240, at which step the CPU 51 stops the first timer 56 and resets the same to zero. At step 250, it is determined whether or not the flag F is 1. When it is determined, at step 250, that the flag F has a value of 1, the control process proceeds to step 260. At this step, the CPU 51 activates the air suspension actuator 14a provided for the right front wheel so that the damping force of the shock absorber 12a is altered to SPORT. When it is determined, at step 250, that the flag F is not 1, that is, F=2, the CPU 51 activates the air suspension actuator 14a at step 270 so that the damping force of the shock absorber 12a is altered to HARD. After executing step 260 or step 270, the CPU 51 resets the flag F to zero at step 275, and starts to operate the second timer 57 at step 280. Then the control process returns to step 110, and the aforementioned procedure after step 110 is repeatedly executed.

When it is determined, at step 130 (FIG. 6A), that the damping force of the shock absorber 12a is not SOFT, that is, either HARD or SPORT, the control process proceeds to step 290, at which step the CPU 51 determines whether or not time $t_2$ indicated by the second timer 57 indicates time $t_2$ which is equal to or greater than a predetermined delay time (hold time) Tb. When it is determined, at step 290, that $t_2 \geq Tb$, the control process proceeds to step 300, at which step the CPU 51 stops the operation of the second timer 57 and resets the same to zero. At step 310 (FIG. 6B), the CPU 51 drives the air suspension actuator 14a so that the damping force of the shock absorber 12a is altered to SOFT. At this time, if the damping force of the shock absorber 12a has already been set to SOFT, this state is maintained as it is. Then the control returns to step 110. On the other hand, when it is determined, at step 290, that $t_2 < Tb$, the control returns to step 110.

Figure 7B:
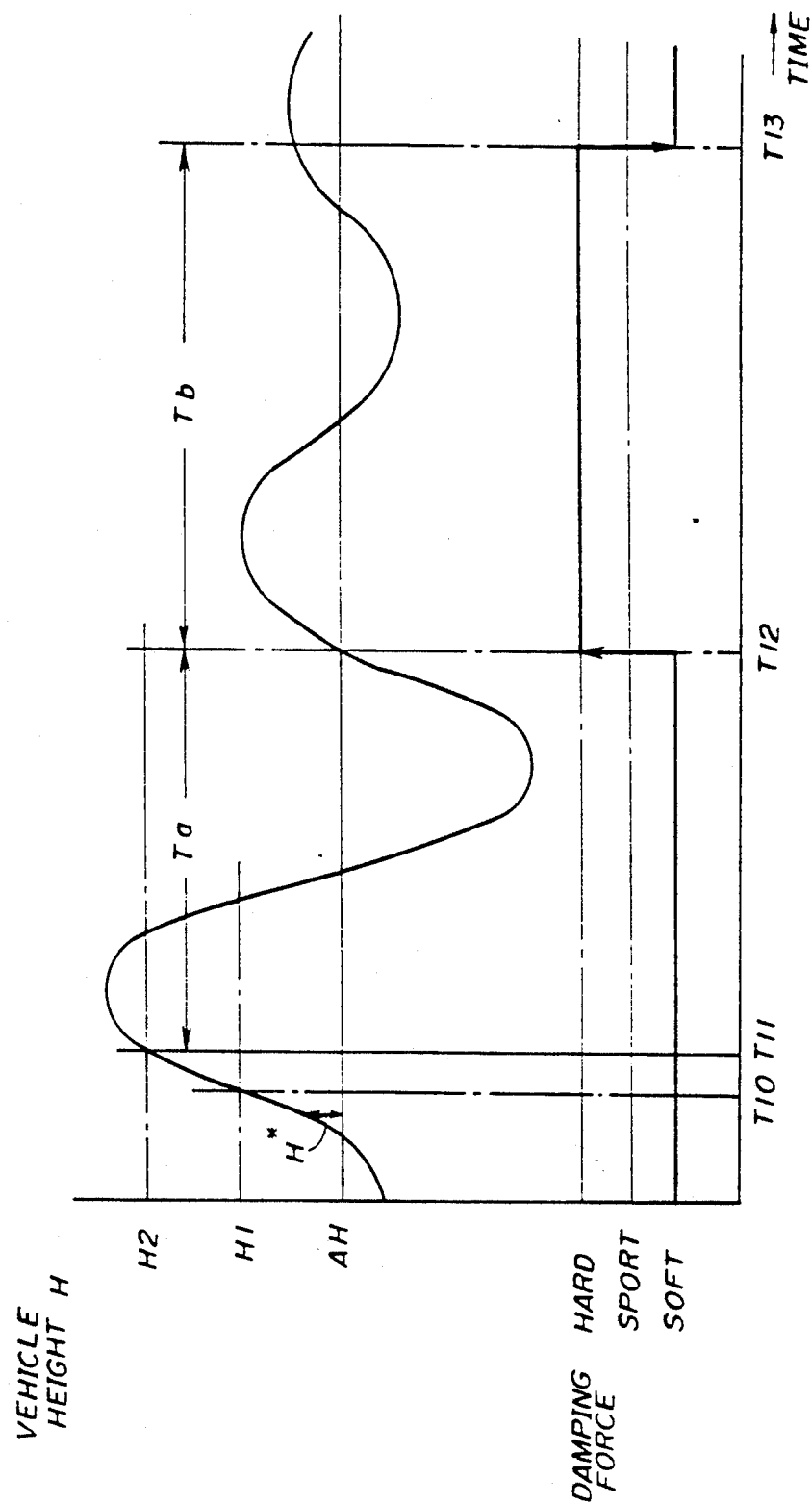

A description will now be given of an example of the aforementioned shock absorber control with reference to the timing charts of FIGS. 7A and 7B. In a case where one of the wheels runs over an obstacle on a road or the vehicle attitude is abruptly changed due to driving conditions, the vehicle height H is greatly changed and becomes greatly different from the averaged vehicle height AH. When the vehicle height H changes and the vehicle height displacement H* becomes greater than the threshold value H1 for SPORT at time T1, as shown in FIG. 7A, the first timer 56 is started. Until the first timer 56 becomes indicative of the predetermined delay time Ta, the CPU 51 continuously determines whether or not the vehicle height displacement H* has become greater than the threshold value H2 for HARD (a sequence of steps 150 and 160). When it is determined that the vehicle height displacement H* is not greater than the threshold value H2 at time T2 (corresponding to the end point of the predetermined delay time Ta), the damping force of the shock absorber 12a is altered to SPORT (a sequence of steps 160-190 and steps 230-260). The damping force of the shock absorber 12a is restored to SOFT when the predetermined delay time Tb (hold time) elapses (time T3) after the damping force thereof is altered to SPORT (a sequence of steps 280-310).

On the other hand, as shown in FIG. 7B, when the vehicle height displacement H* becomes greater than the threshold value H2 (time T11) during a time before the predetermined delay time Ta elapses from time T10 when the vehicle height displacement H* becomes greater than the threshold value H1 for SPORT, the CPU 51 resets the first timer 56 to zero and has the first timer 56 start to count from the revised starting point corresponding to time T11. Thereby, when the predetermined delay time Ta elapses from time T11 (time T12), the damping force of the shock absorber 12a is altered to HARD (a sequence of steps 200-250). When the predetermined delay time Tb elapses (T13) after the damping force of the shock absorber 12a is altered to HARD, the damping force thereof is returned to SOFT (a sequence of steps 280-310).

In the above-mentioned manner, it becomes possible to alter the magnitude of the damping force with timing which is in synchronism with the vibration cycle (the end of the first one-cycle of the vibration) even when the vehicle height displacement H* is so small that it barely exceeds the threshold value H1 for SPORT or even when the vehicle height displacement H* is so large that it exceeds the threshold value H2 for HARD. Thus, it becomes possible to eliminate ride discomfort due to the fact that the damping force is altered irrespective of the current vehicle height. For example, according to the aforementioned prior shock absorber controller, the magnitude of the damping force is occasionally altered when the vehicle height is considerably greater than the mean vehicle height or after the vehicle height is returned to the mean vehicle height.

It should be appreciated that the damping force of each shock absorber is altered at a time corresponding to the end of the first one-cycle of the vibration. This arrangement is extremely effective in improving ride comfort because it is possible to suppress vibration at a time when the vehicle height caused by vibration is restored to the averaged vehicle height AH at once and is then restored thereto again after being decreased. It will be noted that the frequency of vibration of the vertical movement of the vehicle body is approximately constant independently of the amplitude thereof. From this point of view, the delay time Ta can be determined beforehand by means of, for example, experiments or calculation, so that the delay time Ta is approximately restored to the aforementioned mean position when it elapses. Similarly, the delay time (hold time) Tb can be determined beforehand.

In the aforementioned embodiment, the delay time (Ta) after the vehicle height displacement H* exceeds the threshold value H1 for SPORT is equal to the delay time (Ta) after the vehicle height displacement H* exceeds the threshold value H2 for HARD. Alternatively, it is possible to set both the delay times to be different from each other. In this case, the timer 56 for measuring the delay time Ta is formed of a down counter, for example. The down counter counts down the clock signal CK from a preset value. When it is determined that the averaged height displacement H* exceeds the threshold value H1 for SPORT, a first preset value is written into the down counter and is started. After that, when it is determined that the averaged height displacement H* exceeds the threshold value H2 for HARD, the down counter is reset and a second preset value is written therein. When the first preset value is different from the second preset value, the delay time Ta related to SPORT is different from the delay time Ta related to HARD.

In the aforementioned embodiment, two threshold values H1 and H2 are used. Alternatively, three or more threshold values can be used.

The present invention is not limited to the specifically described embodiment, and variations and modifications may be made without departing from the scope of the present invention.

What is claimed is:

1. A shock absorber controller comprising:
   vertical movement detection means for detecting a vertical movement of a vehicle body relative to a wheel;
   damping force alteration means for altering a damping force of a shock absorber provided between said vehicle body and said wheel;
   first excess determination means, coupled to said vertical movement detection means, for determining whether or not the vertical movement of the vehicle body exceeds a first threshold value;
   alteration instruction output means, coupled to said damping force alteration means and said first excess determination means, for generating an instruction signal which is supplied to said damping force alteration means when a predetermined delay time elapses from a first time at which said first excess determination means determines that the vertical movement of the vehicle body exceeds said first threshold value, said instruction signal instructing said damping force alteration means so that the damping force of the shock absorber is increased;
   second excess determination means, coupled to said vertical movement output means, for determining, during said predetermined delay time from said first time, whether or not the vertical movement of the vehicle body exceeds a second threshold value which indicates a position of the vehicle body farther from a mean position of the vehicle body than a position corresponding to said first threshold value; and
   starting point change means, coupled to said alteration instruction output means and said second excess determination means, for changing a starting point of said predetermined delay time from said first time to a second time at which said second excess determination means determines that the vertical movement of the vehicle body exceeds said second threshold value.

2. A shock absorber controller as claimed in claim 1, wherein said alteration instruction output means comprises timer means for measuring said predetermined delay time from said starting point which is one of either said first time or said second time.

3. A shock absorber controller as claimed in claim 1, wherein said predetermined delay time is determined so that said vehicle body is approximately restored to said mean position when the predetermined delay time elapses.

4. A shock absorber controller as claimed in claim 1, wherein:
   said alteration instruction output means comprises timer means for measuring said predetermined delay time from said starting point which is one of either said first time or said second time; and
   said starting point change means comprises means for resetting said timer means to zero and causing said timer means to start to measure said predetermined delay time from said second time when said second excess determination means determines that the vertical movement of the vehicle body exceeds said second threshold value.

5. A shock absorber control device as claimed in claim 1, wherein said alteration instruction output means generates said instruction signal which instructs said damping force alteration means so that the damping force of said shock absorber is increased to a first state in a case where the vertical movement of the vehicle body is greater than said first threshold value and less than said second threshold value and is increased to a second state in a case where the vertical movement exceeds said second threshold value, and wherein the damping force in said second state is greater than that in said first state.

6. A shock absorber control device as claimed in claim 1, wherein said alteration instruction output means comprises:

timer means for measuring a predetermined hold time from an end point of said predetermined delay time; and means for generating another instruction signal which instructs said damping force alteration means to decrease the damping force of the shock absorber after the damping force of the shock absorber is maintained at an increased magnitude during said predetermined hold time.

7. A shock absorber controller as claimed in claim 6, wherein the damping force of the shock absorber is decreased to a magnitude suitable for said mean position of the vehicle body after said predetermined hold time.

8. A shock absorber controller as claimed in claim 1, wherein said vertical movement detection means comprises vehicle height detection means for detecting a vehicle height of said vehicle body, and said vertical movement of the vehicle body is represented by said vehicle height.

9. A shock absorber controller as claimed in claim 1, wherein said vertical movement detection means comprises:

vehicle height detection means for periodically detecting a vehicle height of said vehicle body;

averaging means for averaging past vehicle heights supplied from said vehicle height detection means and for outputting an averaged vehicle height; and vehicle height displacement calculating means, coupled to said vehicle height detection means and said averaging means, for calculating an absolute value of a difference between said averaged vehicle height and a current vehicle height, said absolute value of the difference indicating said vertical movement of the vehicle body.

10. A shock absorber controller comprising:

vertical movement detection means for detecting a vertical movement of a vehicle body relative to a wheel;

damping force alteration means for altering a damping force of a shock absorber provided between said vehicle body and said wheel;

determination means, coupled to said vertical movement detection means, for determining whether or not it is necessary to alter the damping force of said shock absorber on the basis of the magnitude of said vertical movement of the vehicle body exceeding at least one of at least two threshold values; and control means, coupled to said vertical movement detection means and said damping force alteration means, for generating an instruction signal which is supplied to said damping force alteration means when the vertical movement of the vehicle body is returned approximately to a mean position of the vehicle body after said determination means determines that it is necessary to alter the damping force of said shock absorber, said instruction signal instructing said damping force alteration means to increase the damping force of the shock absorber, wherein said control means comprises means for generating the instruction signal at a predetermined delay time after the greatest one of said at least two threshold values is exceeded.

11. A shock absorber controller as claimed in claim 10, wherein said control means comprises timer means for measuring a predetermined delay time from a time at which said determination means determines that it is necessary to alter the damping force of said shock absorber, and wherein said control means generates said instruction signal after said predetermined delay time.

12. A shock absorber controller as claimed in claim 10, wherein said damping force of the shock absorber is altered in synchronism with a cycle of a vibration of said vertical movement of the vehicle body.

13. A shock absorber controller comprising:

vertical movement detection means for detecting a vertical movement of a vehicle body relative to a wheel;

damping force alteration means for altering a damping force of a shock absorber provided between said vehicle body and said wheel;

determination means, coupled to said vertical movement detection means, for determining whether or not it is necessary to alter the damping force of said shock absorber on the basis of the magnitude of said vertical movement of the vehicle body; and control means, coupled to said vertical movement detection means and said damping force alteration means, for generating an instruction signal which is supplied to said damping force alteration means when the vertical movement of the vehicle body is returned approximately to a mean position of the vehicle body after said determination means determines that is necessary to alter the damping force of said shock absorber, said instruction signal instructing said damping force alteration means to increase the damping force of the shock absorber, wherein said determination means comprises:

first excess determination means for determining whether or not the vertical movement of the vehicle body exceeds a first threshold value; and second excess determination means for determining whether or not the vertical movement of the vehicle body exceeds a second threshold value which indicates a position of the vehicle body farther from a mean position of said vehicle body than a position corresponding to said first threshold value, and wherein said control means comprises:

timer times for measuring a predetermined delay time from a first time at which said first excess determination means determines that the vertical movement of the vehicle body exceeds said first threshold value; and starting point change means for changing a starting point of said predetermined delay time from said first time to a second time at which said second excess determination means determines that the vertical movement of the vehicle body exceeds said second threshold value.

14. A shock absorber controller as claimed in claim 13, wherein said timer means comprises a down counter, and wherein said down counter starts to count down a clock signal from a first preset value when the starting point of said predetermined delay time corresponds to said first time, and starts to count down said clock signal from a second preset value when the starting point of said predetermined delay time corresponds to said second time.

15. A shock absorber controller as claimed in claim 14, wherein said first preset value is equal to said second preset value.

16. A shock absorber controller as claimed in claim 14, wherein said first preset value is different from said second preset value.

* * * * *